(12) United States Patent
Chen

(10) Patent No.: US 11,623,572 B2
(45) Date of Patent: Apr. 11, 2023

(54) AUTOMOTIVE DOOR PEDAL

(71) Applicant: NINGBO MOTORMAN E-COMMERCE CO., LTD., Zhejiang (CN)

(72) Inventor: Weizhen Chen, Zhejiang (CN)

(73) Assignee: NINGBO MOTORMAN E-COMMERCE CO., LTD., Ningbo (CN)

( * ) Notice: Subject to any disclaimer, the term of this patent is extended or adjusted under 35 U.S.C. 154(b) by 110 days.

(21) Appl. No.: 17/467,264

(22) Filed: Sep. 5, 2021

(65) Prior Publication Data

US 2023/0034860 A1 Feb. 2, 2023

(30) Foreign Application Priority Data

Jul. 27, 2021 (CN) .......................... 202110850258.0

(51) Int. Cl.
*B60R 3/00* (2006.01)

(52) U.S. Cl.
CPC .................................... *B60R 3/007* (2013.01)

(58) Field of Classification Search
CPC .................................. B60R 3/02; B60R 3/007
See application file for complete search history.

(56) References Cited

U.S. PATENT DOCUMENTS

| | | | |
|---|---|---|---|
| 4,785,910 A * | 11/1988 | Tonkovich | B60R 3/007 182/61 |
| 4,869,520 A * | 9/1989 | Cole | E06C 7/081 182/127 |
| 6,471,002 B1 * | 10/2002 | Weinerman | B60R 3/02 280/166 |
| 6,767,023 B1 * | 7/2004 | Nicholson | B60R 3/007 280/165 |
| 8,827,294 B1 * | 9/2014 | Leitner | B60R 3/02 280/166 |
| 9,981,608 B1 * | 5/2018 | DoVale | B60D 1/58 |
| 2008/0100025 A1 * | 5/2008 | Leitner | B60R 3/02 280/166 |
| 2015/0084304 A1 * | 3/2015 | Mendoza | B60R 3/02 280/163 |
| 2017/0008459 A1 * | 1/2017 | Leitner | B60R 3/02 |
| 2017/0334257 A1 * | 11/2017 | Stickles | B60D 1/04 |
| 2019/0329710 A1 * | 10/2019 | Mao | B60R 3/005 |
| 2020/0361389 A1 * | 11/2020 | Leitner | B60R 3/02 |
| 2021/0347302 A1 * | 11/2021 | Wang | B60R 3/007 |

(Continued)

*Primary Examiner* — Jeffrey J Restifo

(57) ABSTRACT

The disclosure provides an automotive door pedal, including a stepping portion, a support rod, a pin shaft and a support block. A hook is arranged at a front end of the stepping portion and mounting portions are arranged at a lower end thereof, which forms a mounting region. A regulating groove is formed in the mounting portion, where there is a head of the support rod, contacting with a lower bottom surface of the stepping portion when unfolding. The pin shaft movably connects the support rod in the mounting region, contacting with a sidewall of the regulating groove when unfolding. The support block is rotatably hinged to a lower end of the support rod and contact with the door frame when unfolding. The automotive door pedal of the disclosure enjoys compact structure, strong support force and is convenient to use, so it can be widely used by different automobiles.

11 Claims, 11 Drawing Sheets

(56) References Cited

U.S. PATENT DOCUMENTS

2022/0134955 A1\* 5/2022 Kaddouh ................. E06C 5/02
                                                                    182/127
2022/0242320 A1\* 8/2022 Wang ..................... B60R 3/007
2023/0009100 A1\* 1/2023 McNeely ................ B60R 3/00
2023/0034860 A1\* 2/2023 Chen ..................... B60R 3/007

\* cited by examiner

AUTOMOTIVE DOOR PEDAL

CROSS REFERENCE TO RELATED APPLICATIONS

The present application claims the benefit of Chinese Patent Application No. 202110850258.0 filed on Jul. 27, 2021, the contents of which are incorporated herein by reference in their entirety.

TECHNICAL FIELD

The disclosure relates to an automotive fitting, particularly to an automotive door pedal.

BACKGROUND

With the increasing popularization of automobiles, in order to meet the increasing demands of people on spaces of automobiles, automobile manufacturers keep enlarging bodies during automobile manufacturing to provide better passenger room for users, so as to increase the market shares of their own products. Especially for Sport Utility Vehicles (SUVs), when a SUV or a relatively high roof of automobile is loaded with an object, auxiliary equipment, e.g., a stool or a ladder, is needed for loading. Since the ladder and the stool are relatively large in volume and inconvenient to carry, the loading of the object on the roof of automobile is affected. In order to solve the foregoing problem, a folding stool is adopted, which can be unfolded when used. However, due to the low structural strength and the poor stability in placement of the folding stool, particularly on uneven surface of outdoor, thus the safety of the folding stool is poor and it is inconvenient to use.

SUMMARY

Technical Problem to be Solved

The technical problem to be solved by the disclosure is to provide an automotive door pedal which is convenient to use, high strength, good safety and can be folded and adjusted rapidly.

Technical Solution to the Problem

The disclosure provides an automotive door pedal, which includes:

a stepping portion 2, where a stepping plane configured to support a human body is formed on an upper surface of the stepping portion 2, a hook 1 configured to be connected with an automotive door bolt and used as a first support end is arranged at a front end of the stepping portion 2, mounting portions are arranged at two sides of a lower end of the stepping portion 2, a mounting region is formed between the two mounting portions, and a regulating groove 110 is formed in the mounting portion;

a support rod 3, where a head of the support rod 3 is located in the mounting region and contacts with a lower bottom surface of the stepping portion as a second support end in an unfolded state;

a pin shaft 4, fixed on the support rod 3, where two ends of the pin shaft 4 are sleeved in the regulating groove 110 and movably connect the support rod 3 between the two mounting portions, and the pin shaft 4 contacts with a sidewall of the regulating groove 110 as a third support end in the unfolded state; and a support block 5, rotatably hinged to a lower end of the support rod 3 and configured to contact with an automotive door frame as a fourth support end in the unfolded state.

Further, two mutually parallel supporting plates 11 are fixed at the lower end of the stepping portion 2. A length direction of the supporting plate 11 is parallel to an axis of the stepping portion 2. The mounting region configured to accommodate the support rod 3 is formed between the two supporting plates 11.

Further, an upper end of the supporting plate 11 bends 90 degrees radially outwards to form a support connecting portion 12 for connection with the stepping portion 2. A hole body is formed in the support connecting portion 12 to form a connecting hole 120.

Further, the regulating groove 110 includes a first groove body 1101, and a length direction of the first groove body 1101 is parallel to that of the stepping portion 2. One or more second groove bodies 1102 are formed in an upper end or lower end of the first groove body 1101. A front end of the second groove body 1102 is communicated with the first groove body 1101 through a connecting groove body 1103. The pin shaft 4 is in the first groove body in a folded state, and the pin shaft 4 is in the second groove body 1102 and contacts with an end portion of the second groove body 1102 in the unfolded state.

Further, a top of the support rod 3 contacts with a bottom surface of the stepping portion 2 under the action of gravity when the pin shaft 4 is in the second groove body 1102, and an included angle is formed between the stepping portion 2 and the support rod 3. The hook and the support block are respectively connected with the door bolt and the automotive door frame to form triangular support structures.

Further, a distance from the pin shaft to an upper end of the support rod is shorter than that from the pin shaft to the lower end of the support rod, and a ratio of the two is ⅙ to ½.

Further, an included angle between the support rod 3 and the stepping plane is 45 degrees to 70 degrees in the unfolded state.

Further, a shaft hole 301 configured to mount the pin shaft 4 penetrates through two sides of the support rod 3. A locking hole 302 configured to mount a locking bolt is formed in a sidewall of the shaft hole. An axis of the locking hole is perpendicular to that of the shaft hole. The pin shaft 4 is sleeved in the shaft hole and fixed by the locking bolt.

Further, a positioning recess hole 401 for clamping and axially positioning a head of the locking bolt is formed in a sidewall of the pin shaft.

Further, the support block 5 includes a support block body. A front end face of the support block body is configured to contact with the automotive door frame as a support plane. Two sides of the support block body extend backwards to form support block connecting portions 51. An end portion of the lower end of the support rod 3 is rotatably mounted between the two support block connecting portions through a shaft body or a bolt.

Further, widths of the first groove body 1101, the connecting groove body 1103, and the second groove body 1102 sequentially decrease. The connecting groove body is formed aslant.

Beneficial Effects

According to the automotive door pedal of the disclosure, angles of the support rod and the support block may be regulated as required to adapt to different automobile types, so that the application range is wide. The automotive door pedal adopts a unique structural design, is high in support strength and reliability, may be operated conveniently and rapidly and folded and unfolded rapidly, and after folded, occupies a small space and is convenient to carry and store. A stamping process is adopted for forming, so that the automotive door pedal is simple in process, low in manufacturing cost, high in strength, and long in service life.

DETAILED DESCRIPTION

Embodiments of the disclosure will be introduced in detail below in combination with the drawings.

Referring to FIGS. 1 to 12, the disclosure provides an automotive door pedal, which is suspended on a door bolt on an automotive door frame and may bear the weight of a human body who steps on it to load an object at a position such as a roof, for example, placing and fastening the object to a roof rack. The automotive door pedal mainly includes a stepping portion 2, a support rod 3, a pin shaft 4, and a support block 5. The stepping portion is used for stepping in use, and is also configured to mount other components as a mounting carrier.

The structure will be described in detail below in combination with the drawings.

Figure 1:
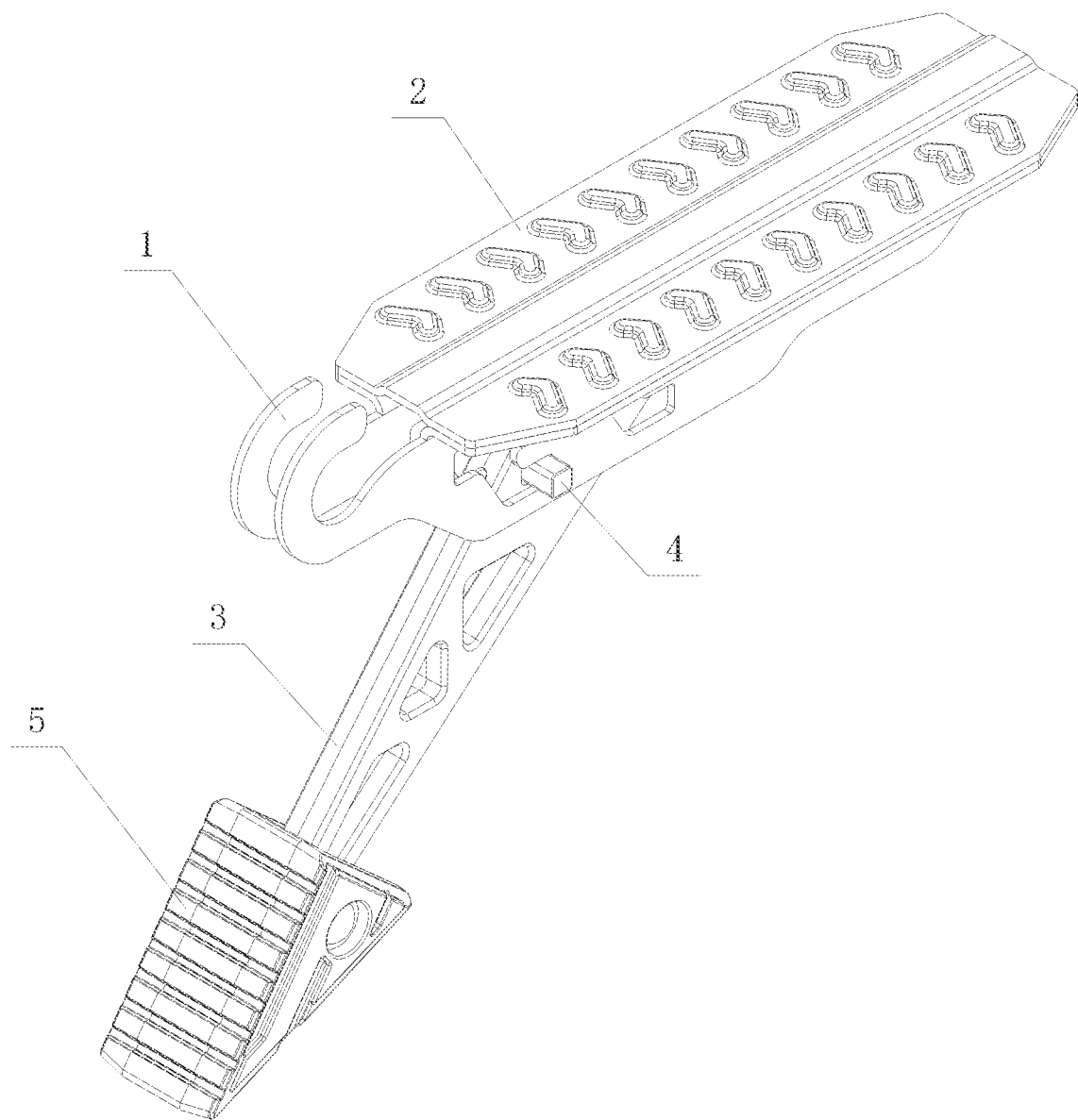
FIG. 1 is a schematic structural diagram of an automotive door pedal according to the disclosure.
Figure 2:
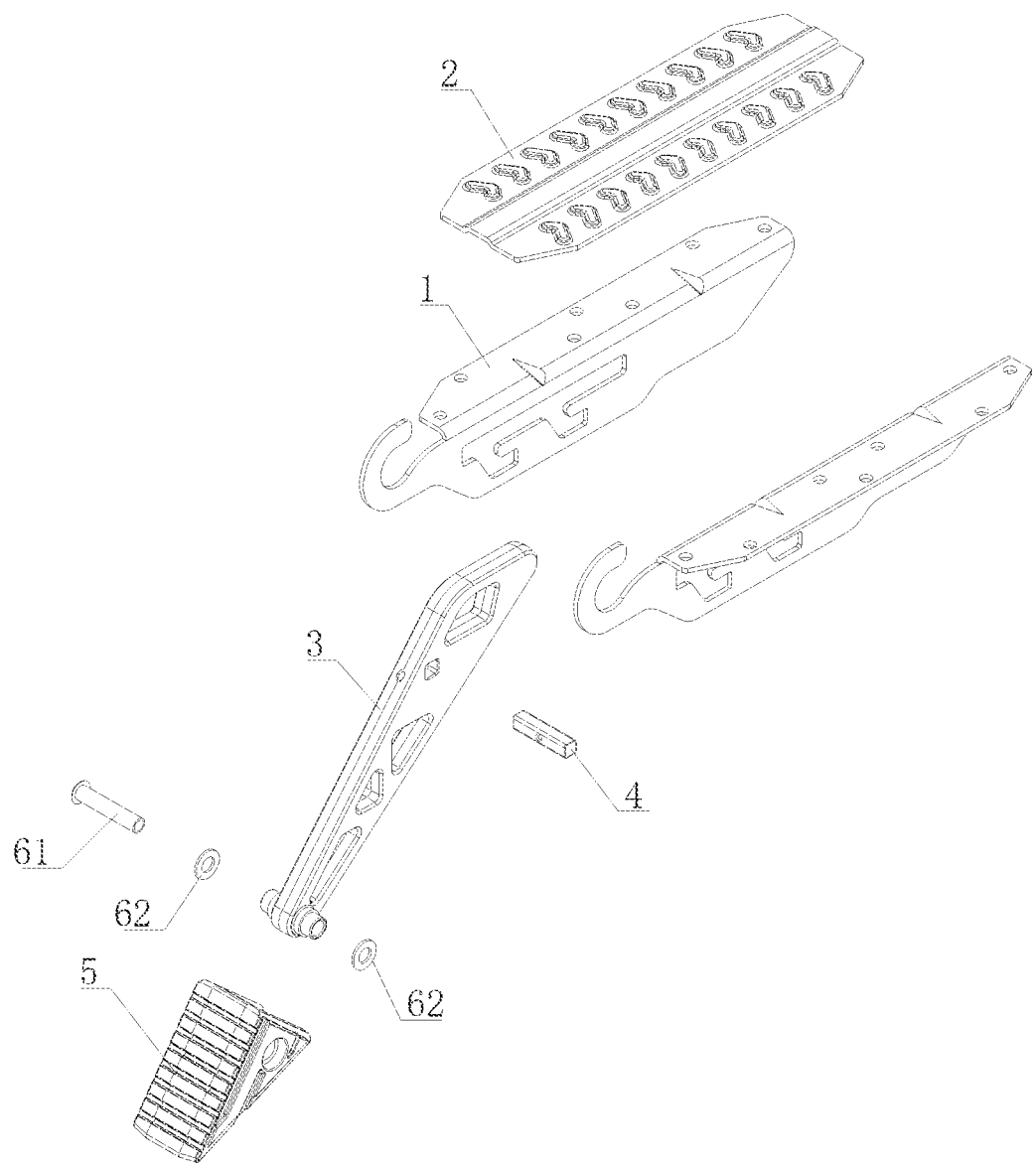
FIG. 2 is an exploded view of an automotive door pedal according to the disclosure.
Figure 3:
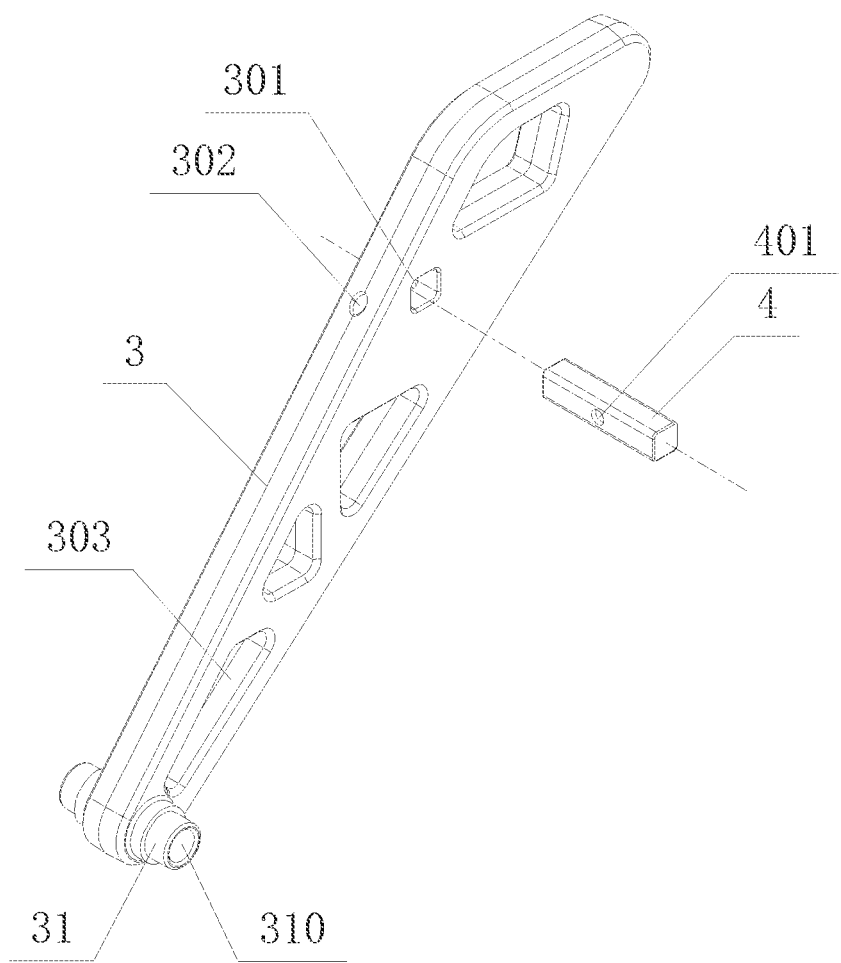
FIG. 3 is a schematic connection diagram of a support rod and a pin shaft of an automotive door pedal according to the disclosure.

A stepping plane configured to support a human body is formed on an upper surface of the stepping portion 2. In order to increase the friction and improve the safety, anti-skid stripes are arranged on the stepping plane to avoid skids in use. In the present embodiment, the stepping portion 2 is stamped from a rectangular steel plate. and has a length of 10 cm to 25 cm and a width of 5 cm to 10 cm. In order to improve the overall structural compactness and the safety in use, rounded angles or bevel angles are formed in four corners of the stepping portion. Referring to FIGS. 1 to 2, a steel plate body is included. A first stepping plane 22 is formed on an upper surface of the steel plate body. Two sides of the steel plate body bend to form second stepping planes 21 after being stamped, and the second stepping planes 21 are parallel to the first stepping plane 22. In the present embodiment, the second stepping plane is lower than the first stepping plane, and a height difference therebetween is 1 mm to 2 mm. An upwards raised anti-skid stripe 211 is formed on the second stepping plane, and the anti-skid stripe is formed by stamping. In order to improve the anti-skid effect, the anti-skid stripes on the two stepping planes form a certain included angle. In the present embodiment, a cross section of the anti-skid stripe is L-shaped. A top surface of the anti-skid stripe is flush with the first stepping plane 22, namely a height of the anti-skid stripe is equal to the height difference between the two stepping planes. The stepping portion is configured to bear the weight of a human body, so that there is a strength requirement. In the present embodiment, the stepping portion has a thickness of 1.0 mm to 3.0 mm, so that the overall weight may be reduced on the premise of ensuring sufficient strength.

Figure 4:
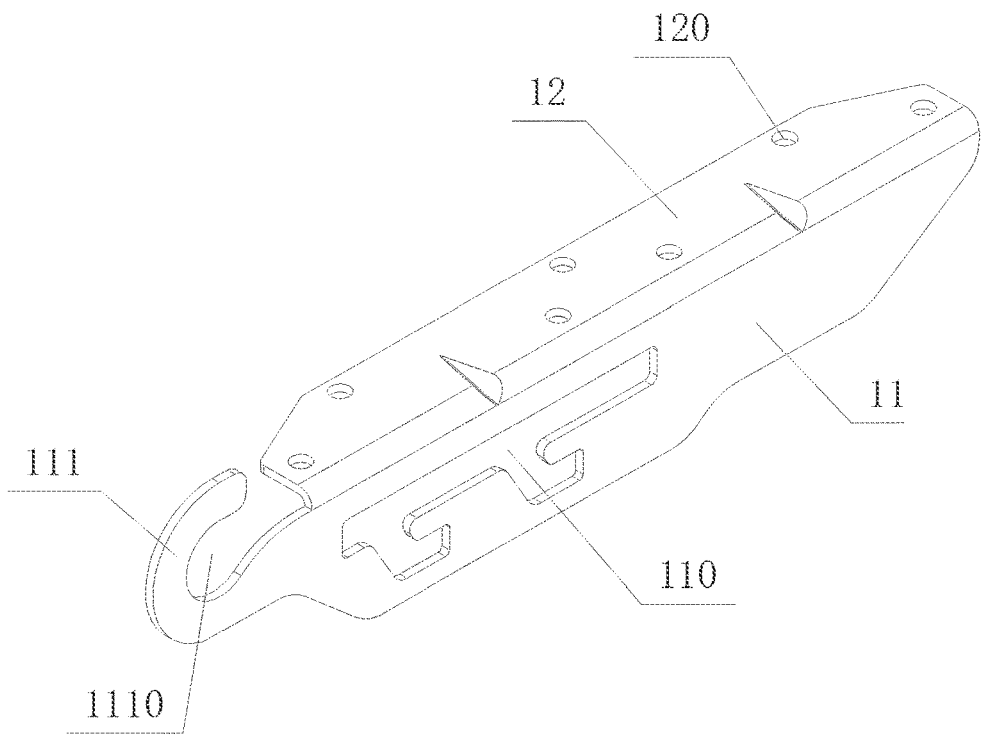
FIG. 4 is a schematic structural diagram of a supporting plate of an automotive door pedal according to the disclosure.
Figure 5:
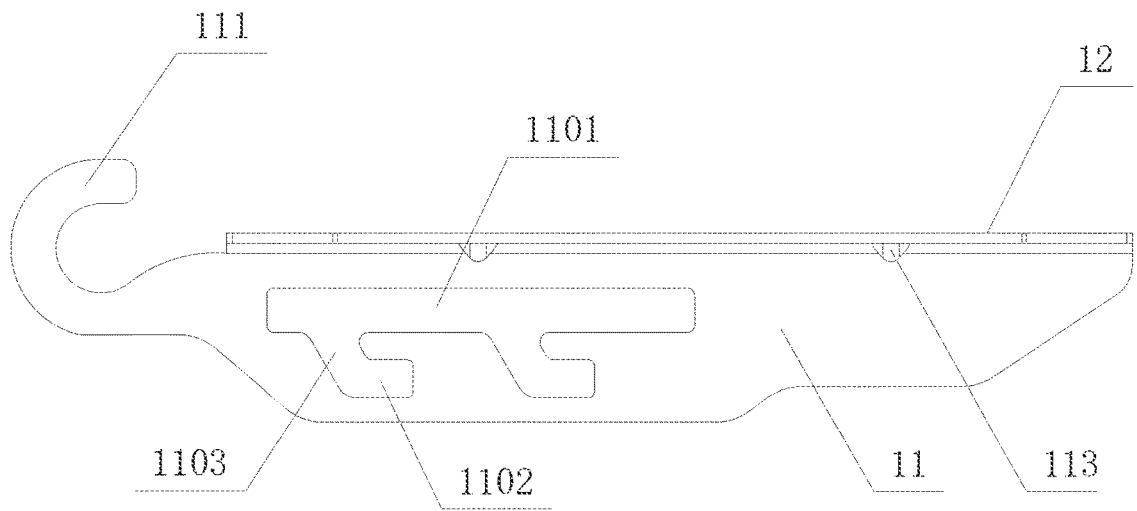
FIG. 5 is a schematic structural diagram of a regulating groove of an automotive door pedal according to the disclosure.
Figure 6:
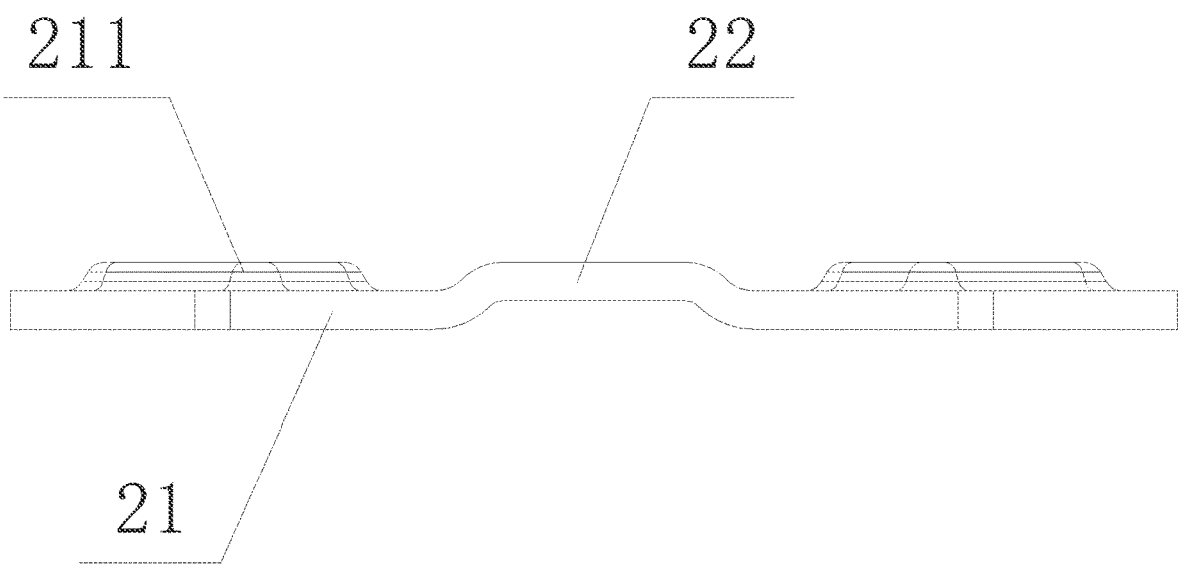
FIG. 6 is a schematic structural diagram of a stepping portion of an automotive door pedal according to the disclosure.
Figure 7:
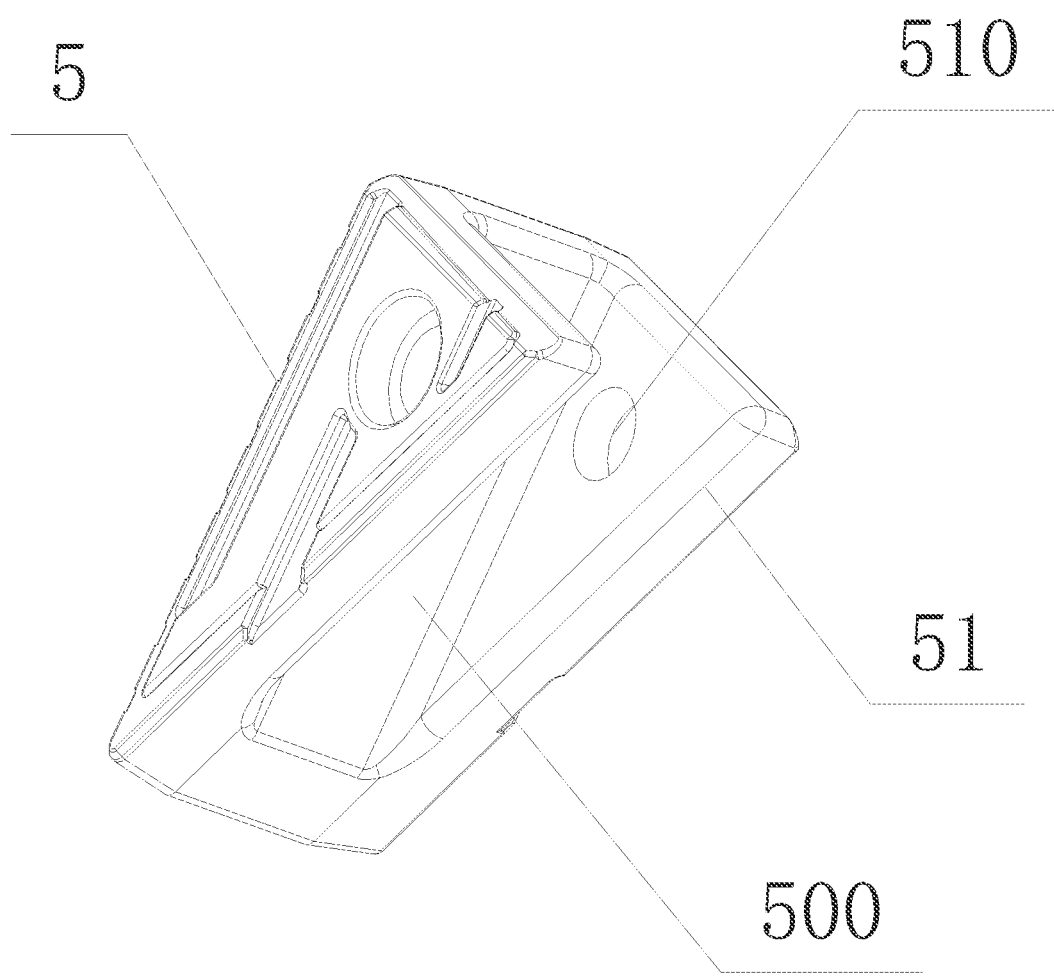
FIG. 7 is a schematic structural diagram of a support block of an automotive door pedal according to the disclosure.
Figure 8:
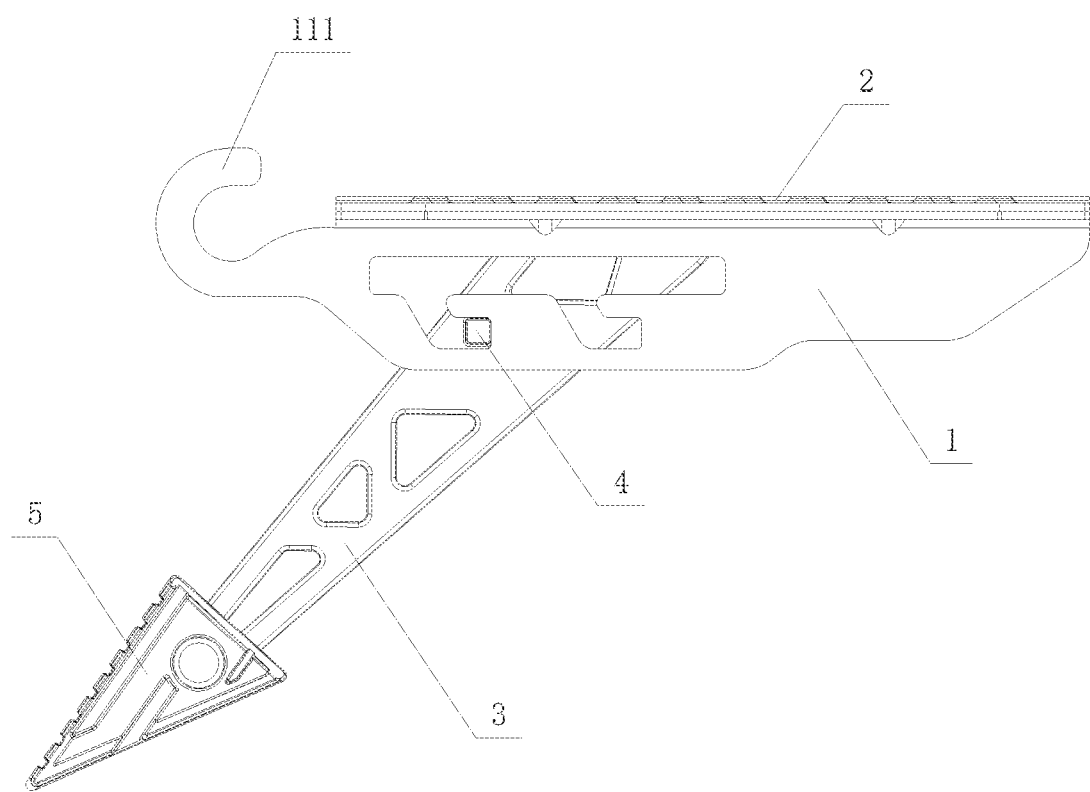
FIG. 8 is a schematic structural diagram of an automotive door pedal in an unfolded state according to the disclosure.
Figure 9:
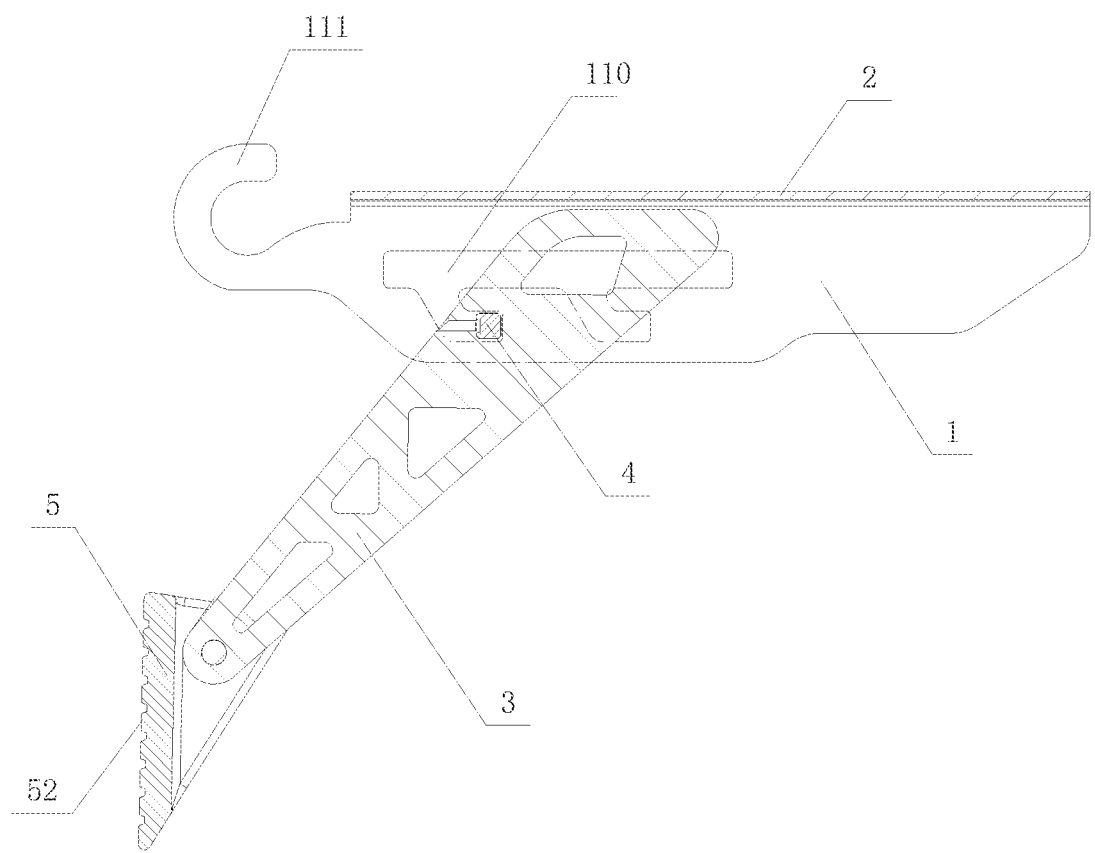
FIG. 9 is a sectional view of an automotive door pedal in an unfolded state according to the disclosure.

A hook 1 is arranged at a front end of the stepping portion 2. The hook 1 is configured to be suspended on the door bolt of the automotive door frame as a first support end in use. Mounting portions are arranged at two sides of a lower end of the stepping portion 2. A strip-type mounting region is formed between the two mounting portions. Two ends and a lower end of the mounting region all extend out of the mounting portions in a penetration manner. A regulating groove 110 is formed in the mounting portion. Referring to FIGS. 2 and 4-5, in the present embodiment, two mutually parallel supporting plates 11 are fixed at the two sides of the lower end of the stepping portion 2. The supporting plates 11 form the abovementioned mounting portions configured to mount the support rod. A length direction of the supporting plate 11 is parallel to an axis of the stepping portion 2. The mounting region configured to accommodate the support rod 3 is formed between the two supporting plates 11. A width of the mounting region is slightly larger than that of the support rod, so as to avoid swaying from side to side. In the present embodiment, the width of the mounting region is 8 mm to 15 mm. A plane where the supporting plate 11 is located is perpendicular to the stepping plane. A hook body 111 is formed by stamping at a front end of the supporting plate. A door bolt accommodation region 1110 configured to accommodate the automotive door bolt is formed in the hook body. In order to improve the reliability of the connection with the automotive door bolt and prevent the hook from being separated in a stepping process, the hook body in the present embodiment is opened backwards. A hook is arranged at the front end of each of the two supporting plates 11. A gap communicated with the mounting region is formed between the two hooks to accommodate the support rod 3 in a folded state. An upper end of the supporting plate 11 bends 90 degrees radially outwards (a side back on to the mounting region) to form a support connecting portion 12. The support connecting portion 12 is configured to connect with the stepping portion 2. In order to improve the connection strength, the stepping portion is fixed with the support connecting portion by welding in the present embodiment. Specifically, a hole body is formed in the support connecting portion 12 to form a connecting hole 120. There are multiple connecting holes 120 formed in the support connecting portion in a length direction. The support connecting portion is in close contact with a lower surface of the stepping portion and is fixed with the lower surface of the stepping portion at the connecting hole by welding. During welding, full-length welding is implemented in the connecting hole, and a weld is planished after welding. The process is simple, the cost is low, meanwhile, the connection strength is high, and the structure is more compact and attractive. In order to improve the overall strength and the attractive appearance, an edge of the support connecting portion is flush with that of the stepping portion.

In the present embodiment, the supporting plate or the support connecting portion is stamped from a steel plate with a thickness of 1.0 mm to 3 mm. When the upper end of the supporting plate bends to form the support connecting portion, one or more reinforcing ribs 113 are formed by stamping therebetween. The reinforcing rib is a strip-type bulge formed by stamping. A length direction of the reinforcing rib is perpendicular to a bending line of the support connecting portion, and is used to improve the overall structural strength and rigidity and avoid deformation and bending in the stepping process.

Regulating grooves 110 are symmetrically formed in the two supporting plates 11 (the mounting portions). The regulating groove 110 includes a first groove body 1101. The first groove body 1101 is a strip-type groove, and a length direction thereof is parallel to that of the stepping portion, namely parallel to a length direction of the mounting region. Meanwhile, a second groove body 1102 is formed in the supporting plate. The second groove body 1102 is located above or below the first groove body. In the present embodiment, the second groove body 1102 is located below the first groove body 1101. There are multiple second groove bodies formed in the length direction of the first groove body. Each second groove body forms a support position (angle). A distance from an end portion of the second groove body 1102 at the farthest end (a side away from the hook) to the head of the pedal is less than ½ of the length of the pedal, so that the formation of an excessively large included angle between the weight on the pedal and the support rod in the unfolded state for use may be avoided, and the effective support of the support rod is further reduced. The front end (the end close to the hook) of the second groove body 1102 is communicated with the first groove body 1101 through a connecting groove body 1103. In the present embodiment, the connecting groove body 1103 is formed aslant, and forms an included angle of 60 degrees with the first groove body. Widths of the first groove body 1101, the connecting groove body 1103, and the second groove body 1102 sequentially decrease. In the present embodiment, the width of the first groove body is 9 mm, the width of the second groove body is 7.5 mm, and the width of the connecting groove body is 7.5 mm, so that convenience is brought to unfolding, folding and regulation operations. In order to improve the overall support strength, a distance between the second groove body 1102 and the first groove body 1101 is longer than 5 mm. For the convenience of folding or unfolding, corners in the regulating groove 110 are all rounded corners.

A head of the support rod 3 is located in the mounting region. A top surface of the head of the support rod contacts with the lower bottom surface of the stepping portion as a second support end in the unfolded state. The support rod 3 is platy as a whole, and a thickness thereof is equal to the width of the mounting region. For the convenience of unfolding and folding, the thickness of the support rod 3 is slightly smaller than that of the mounting region, and a difference therebetween is 0.5 mm to 2 mm. The support rod 3 has an upper-end thickness (parallel to the axis of the mounting region) larger than a lower-end width, and forms a triangle structure with an included angle of 5 to 15 degrees, so that the support force may be increased. A plane is formed at the top of the support rod 3 to form a support plane configured to contact with the bottom surface of the stepping portion. Two ends of the support plane are rounded or beveled. In order to reduce the weight and improve the strength, a weight reduction hole 303 is formed in the support rod 3.

The pin shaft 4 is fixed on the support rod 3. Specifically, a shaft hole 301 configured to mount the pin shaft 4 penetrates through two sides of the support rod 3. A locking hole 302 configured to mount a locking bolt is formed in a sidewall of the shaft hole. An axis of the locking hole is perpendicular to that of the shaft hole. The pin shaft 4 is sleeved in the shaft hole and fixed by the locking bolt. In order to improve the connection strength and avoid movement and even slide-out in use, a positioning recess hole 401 is formed in a sidewall of the pin shaft. During fixation, the locking bolt is in threaded connection with the interior of the locking hole 302, and an end portion thereof extends into the positioning recess hole 401 and tightly presses the pin shaft to axially fix the pin shaft. The pin shaft is axially fixed mainly by the locking bolt and the positioning recess hole rather than the pressure of the locking bolt on the pin shaft, so that the connection strength is improved, and convenience is brought to assembling. In order to further facilitate assembling, a cross section of the pin shaft in the present embodiment is polygonal, preferably rectangular, and the positioning recess hole is formed in one surface of the pin shaft. During assembling, the positioning recess hole is inserted to one side of the locking hole. After assembling, both ends of the pin shaft extend out of the support rod. The two ends of the pin shaft 4 are sleeved in the regulating groove 110 and movably connect (in a rotating or sliding manner) the support rod 3 between the two mounting portions. When the pin shaft 4 is in the second groove body 1102, the top of the support rod 5 contacts with the bottom surface of the stepping portion 2 under the action of gravity, and an included angle is formed between the stepping portion 2 and the support rod 3. The hook and the support block are respectively connected with the door bolt and the automotive door frame to form triangular support structures. In order to form more reliable triangular support structures, a distance from the pin shaft to the upper end of the support rod is shorter than that from the pin shaft to the lower end of the support rod, namely the pin shaft is located above the support rod, and a ratio of the distance from the pin shaft to the upper end of the support rod to that from the pin shaft to the lower end of the support rod is ⅙ to ½. In the unfolded state, an included angle between the support rod 3 and the stepping plane is 45 degrees to 70 degrees. In the unfolded state, the pin shaft contacts with a sidewall of the regulating groove 110 as a third support end. Specifically, the pin shaft 4 is in the first groove body in a folded state. In the unfolded state, the pin shaft 4 is in the second groove body 1102 and contacts with the end portion of the second groove body 1102. Meanwhile, the head of the support rod 3 contacts with the lower end of the pedal as a second support end.

The support block 5 is made of rubber or nylon and rotatably hinged to the lower end of the support rod 3. A rotating axis of the support block is parallel to the axis of the pin shaft 4. Columnar bulges 31 are arranged at the two sides of the lower end of the support rod. A hole 310 for connection with the support block 5 is formed in an end portion of the columnar bulge, so as to contact with the automotive door frame as a fourth support end in the unfolded state. Specifically, the support block 5 includes a support block body. A front end face of the support block body is configured to contact with the automotive door frame as a support surface. An anti-skid stripe is formed on the support surface. Two sides of the support block body extend backwards to form support block connecting portions 51. A support rod mounting region 500 is formed between the two support block connecting portions. During assembling, the lower end of the support rod 3 is sleeved in the support rod mounting region, two ends of the columnar bulges 31 at the end portion of the support rod contact with the support block connecting portions 51, and then the support block 5 is fixed on the support rod 3 through a shaft body or bolt 61, a nut, and a gasket 62. In order to improve the overall structural compactness, counterbores 510 configured to connect the support rod are formed in the two sides of the support block 5. Meanwhile, the counterbore may accommodate the head of the bolt or the nut to avoid the influence on the hand feeling caused by the exposure and collision of the head of the bolt or the nut in use. The support block may rotate 180 degrees and adapt to different support angles, and meanwhile, is convenient to fold when stored, so as to reduce the occupied space. The support block 5 in the present embodiment is of a triangular structure.

The automotive door pedal is unfolded for use. Specifically, the support rod 3 is moved to make the pin shaft on the support rod 3 slide into the needed second groove body. The support rod 3 automatically rotates (around the pin shaft) under the action of gravity to make the upper end of the support rod 3 contact with the lower bottom surface of the stepping portion. In such case, the support rod reaches a maximum unfolded angle. When the support rod cannot rotate automatically, the support rod is rotated manually (around the pin shaft) to make the upper end of the support rod 3 contact with the lower bottom surface of the stepping portion. Then, the angle of the support block is regulated to make the support plane thereof face the automotive door frame. The hook is suspended on the automotive door bolt 71. The whole pedal rotates around the door bolt under the action of gravity until the support block at the lower end of the support rod contacts with a sidewall 72 of the automotive door frame. Since the pin shaft cannot continue moving backwards in the second groove body, both the pin shaft and the top of the support block may provide supports, and the pedal forms a stable triangular support structure. When bearing the weight of a human body, the stepping portion delivers the weight to the hook, the top of the support rod, the pin shaft, and the support block. Therefore, it is necessary to select proper materials for a support frame, the pin shaft, the hook, and the support rod during design to meet the stress requirements.

In the folded state, the support rod is moved to make the pin shaft slide into the first groove body to rotate the support rod to be parallel (or substantially parallel) to the stepping portion, and the support block is rotated, thereby making the occupied space relatively small in the folded state.

Figure 10:
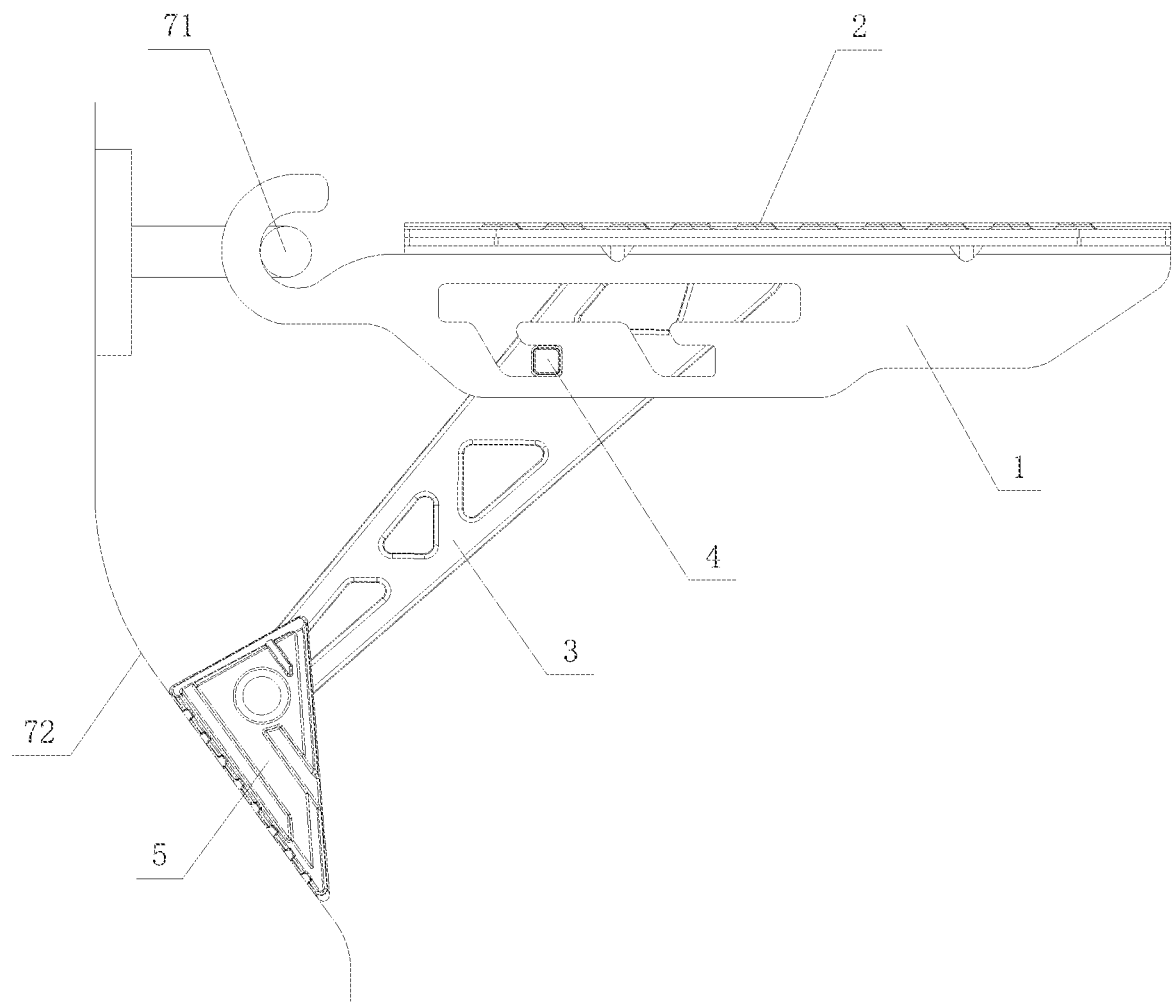
FIG. 10 is a schematic diagram of a use state of Embodiment 1 of an automotive door pedal according to the disclosure.
Figure 11:
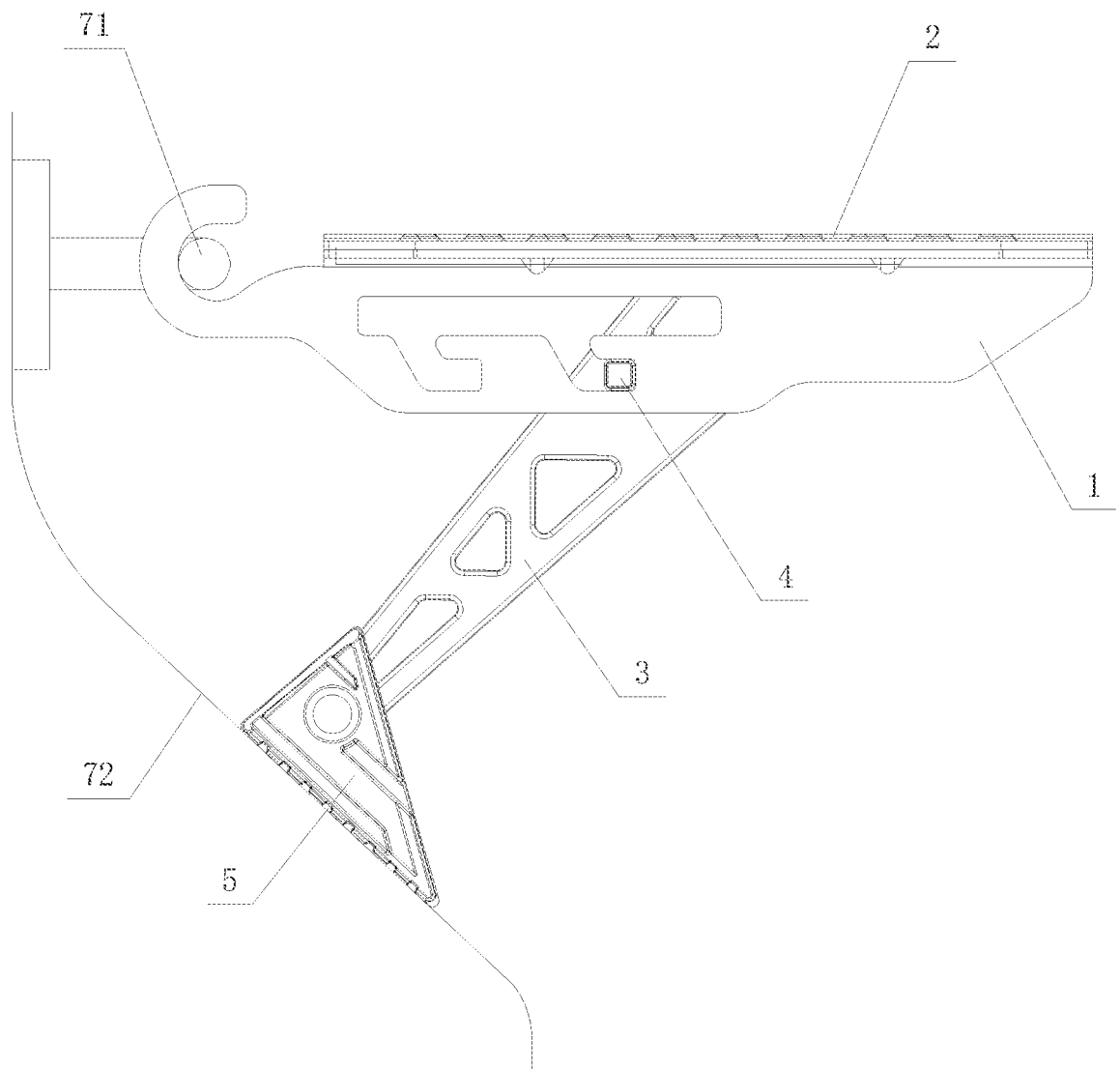
FIG. 11 is a reference diagram of a use state of Embodiment 2 of an automotive door pedal according to the disclosure.
Figure 12:
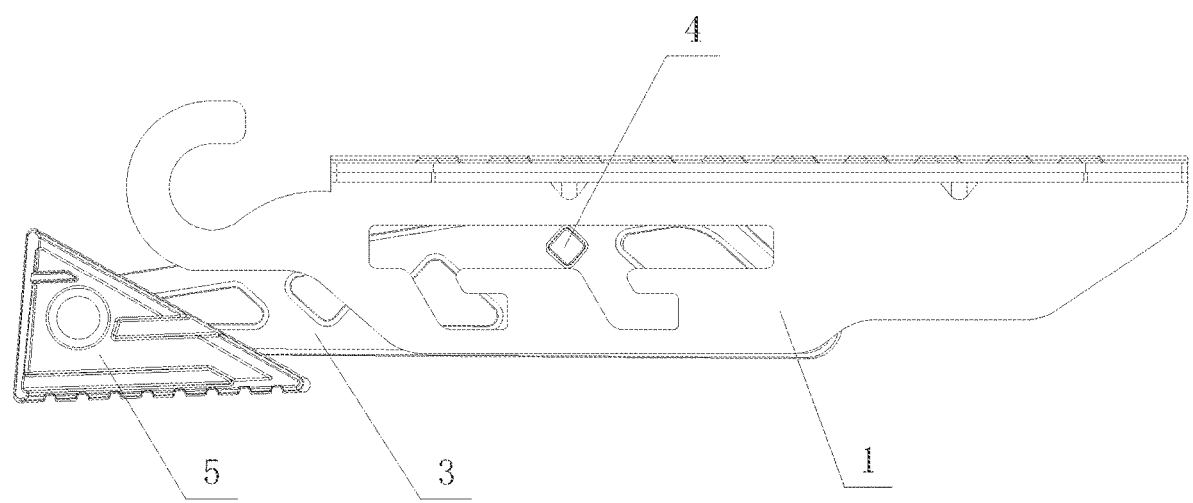
FIG. 12 is a schematic diagram of a folded state of an automotive door pedal according to the disclosure.

The automotive door pedal of the disclosure may be regulated according to different automobile types. Referring to FIGS. 10 to 11 (Embodiment 1 and Embodiment 2), by regulating the switching of the pin shaft in different second groove bodies and the angle of the support block, the angle regulation of the whole triangular support structure is realized, so as to adapt to different automobile types.

According to the automotive door pedal of the disclosure, angles of the support rod and the support block may be regulated as required to adapt to different automobile types, so that the application range is wide. The automotive door pedal adopts a unique structural design, is high in support strength and reliability, may be operated conveniently and rapidly and folded and unfolded rapidly, and after folded, occupies a small space and is convenient to carry and store. A stamping process is adopted for forming, so that the automotive door pedal is simple in process, low in manufacturing cost, high in strength, and long in service life.

The above is only the preferred implementation mode of the disclosure. It should be pointed out that those of ordinary skill in the art may further make a plurality of improvements and embellishments without departing from the technical principle of the disclosure, and these improvements and embellishments shall also fall within the scope of protection of the disclosure.

What is claimed is:

1. An automotive door pedal, comprising:
    a stepping portion (2), wherein a stepping plane configured to support a human body is formed on an upper surface of the stepping portion (2), a hook (1) configured to be connected with an automotive door bolt and used as a first support end is arranged at a front end of the stepping portion (2), mounting portions are arranged at two sides of a lower end of the stepping portion (2), a mounting region is formed between the two mounting portions, and a regulating groove (110) is formed in the mounting portion;
    a support rod (3), wherein a head of the support rod (3) is located in the mounting region and contacts with a lower bottom surface of the stepping portion as a second support end in an unfolded state;
    a pin shaft (4), fixed on the support rod (3), wherein two ends of the pin shaft (4) are sleeved in the regulating groove (110) and movably connect the support rod (3) between the two mounting portions, and the pin shaft (4) contacts with a sidewall of the regulating groove (110) as a third support end in the unfolded state; and
    a support block (5), rotatably hinged to a lower end of the support rod (3) and configured to contact with an automotive door frame as a fourth support end in the unfolded state.

2. The automotive door pedal according to claim 1, wherein two mutually parallel supporting plates (11) are fixed at the lower end of the stepping portion (2), a length direction of the supporting plate (11) is parallel to an axis of the stepping portion (2), and the mounting region configured to accommodate the support rod (3) is formed between the two supporting plates (11).

3. The automotive door pedal according to claim 2, wherein an upper end of the supporting plate (11) bends 90 degrees radially outwards to form a support connecting portion (12) for connection with the stepping portion (2), and a hole body is formed in the support connecting portion (12) to form a connecting hole (120).

4. The automotive door pedal according to claim 3, wherein widths of the first groove body (1101), the connecting groove body (1103), and the second groove body (1102) sequentially decrease, and the connecting groove body is formed aslant.

5. The automotive door pedal according to claim 2, wherein a top of the support rod (3) contacts with a bottom surface of the stepping portion (2) under the action of gravity when the pin shaft (4) is in the second groove body (1102), an included angle is formed between the stepping portion (2) and the support rod (3), and the hook and the support block are respectively connected with the door bolt and the automotive door frame to form triangular support structures.

6. The automotive door pedal according to claim 1, wherein the regulating groove (110) comprises a first groove body (1101), a length direction of the first groove body (1101) is parallel to that of the stepping portion (2), one or more second groove bodies (1102) are formed in an upper end or lower end of the first groove body (1101), a front end of the second groove body (1102) is communicated with the first groove body (1101) through a connecting groove body (1103), the pin shaft (4) is in the first groove body in a folded state, and the pin shaft (4) is in the second groove body (1102) and contacts with an end portion of the second groove body (1102) in the unfolded state.

7. The automotive door pedal according to claim 1, wherein a distance from the pin shaft to an upper end of the support rod is shorter than that from the pin shaft to the lower end of the support rod, and a ratio of the two is ⅙ to ½.

8. The automotive door pedal according to claim 1, wherein an included angle between the support rod (3) and the stepping plane is 45 degrees to 70 degrees in the unfolded state.

9. The automotive door pedal according to claim 8, wherein a positioning recess hole (401) for clamping and axially positioning a head of the locking bolt is formed in a sidewall of the pin shaft.

10. The automotive door pedal according to claim 1, wherein a shaft hole (301) configured to mount the pin shaft (4) penetrates through two sides of the support rod (3), a locking hole (302) configured to mount a locking bolt is formed in a sidewall of the shaft hole, an axis of the locking hole is perpendicular to that of the shaft hole, and the pin shaft (4) is sleeved in the shaft hole and fixed by the locking bolt.

11. The automotive door pedal according to claim 1, wherein the support block (5) comprises a support block body, a front end face of the support block body is configured to contact with the automotive door frame as a support plane, two sides of the support block body extend backwards to form support block connecting portions (51), and an end portion of the lower end of the support rod (3) is rotatably mounted between the two support block connecting portions through a shaft body or a bolt.

* * * * *